June 4, 1968   R. K. FAIRCHILD   3,386,288
QUICK-DISCONNECT BEARING BRACKET FOR A GAS METER DIAPHRAGM
Filed Aug. 10, 1966   2 Sheets-Sheet 1
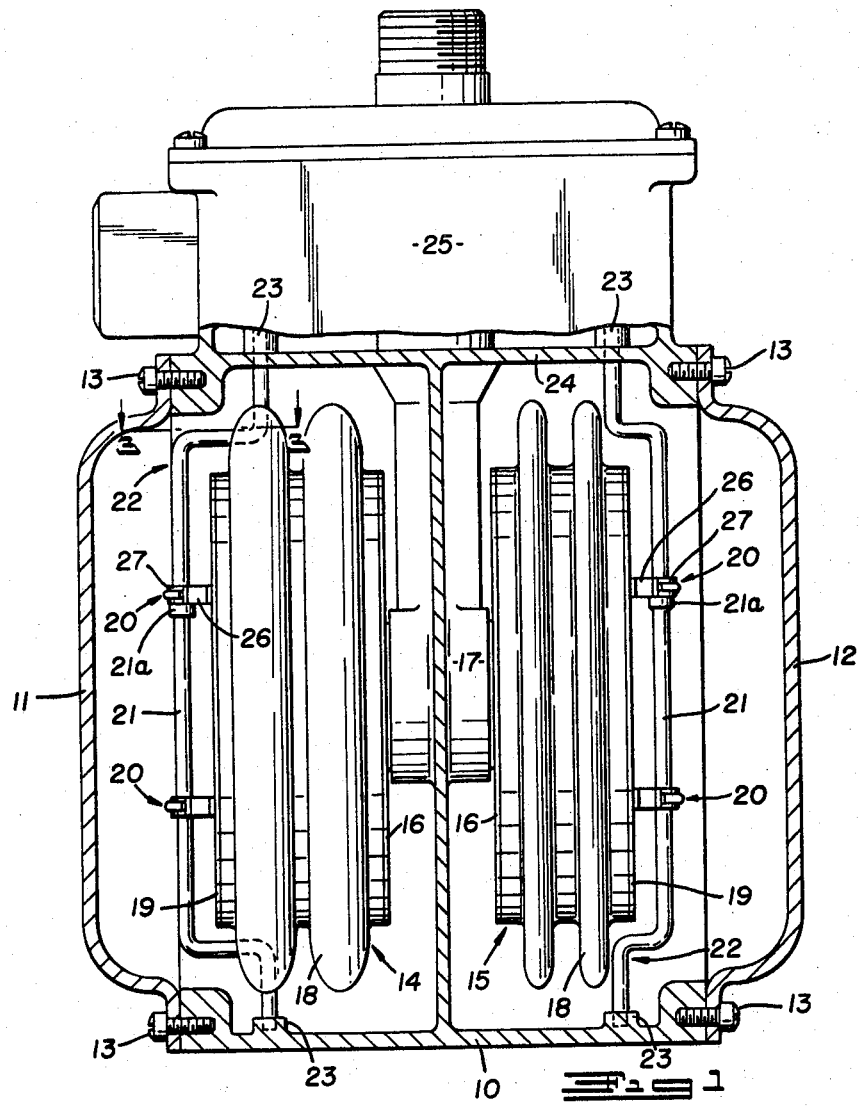
INVENTOR.
ROBERT K. FAIRCHILD
BY
MAHONEY, MILLER, & RAMBO
BY
ATTORNEYS

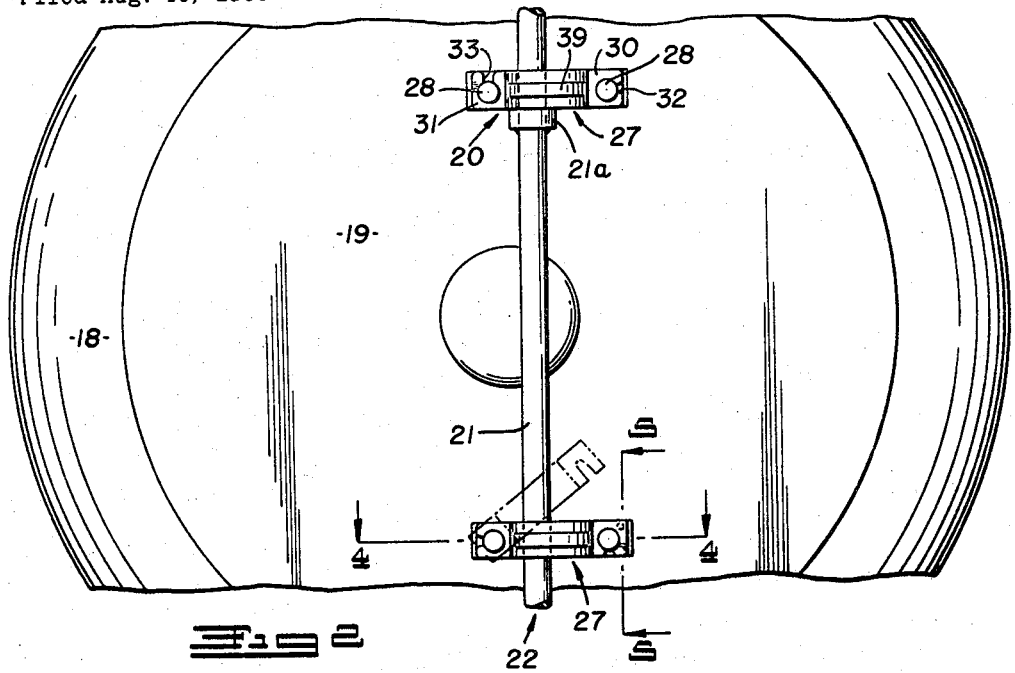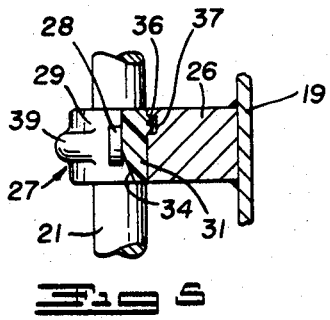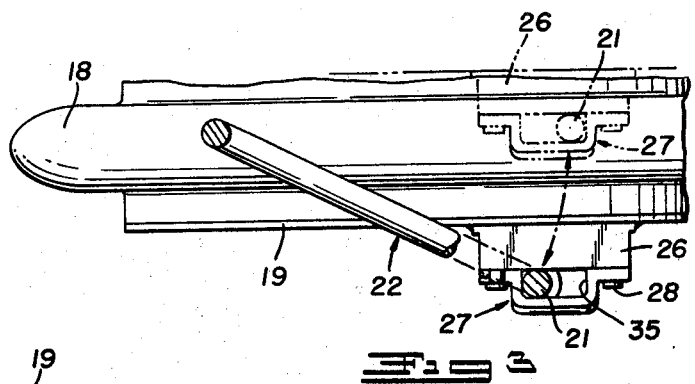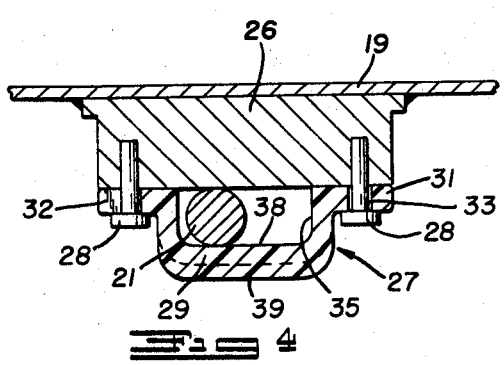

United States Patent Office 3,386,288
Patented June 4, 1968

3,386,288
QUICK-DISCONNECT BEARING BRACKET FOR A GAS METER DIAPHRAGM
Robert Kenneth Fairchild, Fairfield, Ohio, assignor to Lancaster Meter Parts Co., Lancaster, Ohio, a corporation of Ohio
Filed Aug. 10, 1966, Ser. No. 571,501
3 Claims. (Cl. 73—278)

ABSTRACT OF THE DISCLOSURE

An easily detachable bearing bracket for use generally in gas meters of the movable diaphragm type. Said bracket being employed more particularly for securing the flag arm to the diaphragm member. Said bracket having as its novel feature means for quickly disconnecting same as provided by slotted end portions in the strap which engage headed studs in the bearing block.

---

This invention relates generally to gas meters, and more specifically to an improved bearing bracket for detachably connecting the center pan portion of a pulsating diaphragm with the oscillatory, crank portion of an index-driving flag rod. The present bearing bracket finds particular utility as a component part of a four chamber, twin diaphragm, positive displacement-type gas meter. This latter type of gas meter commonly employs a pair of bellow-type diaphragms into and from each of which gas under pressure is alternately introduced and exhausted in a manner to cause pulsating or reciprocating movement of the center pan section of each diaphragm. This reciprocating movement, or stroke, of the diaphragm is directly proportional to the volume of gas flowing into and out of the diaphragm, and the movement of the diaphragm is transmitted and translated through an appropriate, mechanical driving linkage to gauges or indicator dials which indicate and record the volumetric flow of gas through the meter.

In this type of gas meter, each diaphragm assembly includes a movable center pan section which comprises a generally circular sheet metal body to which is connected a pair of relatively spaced, sectional, bearing blocks in which the intermediate crank portion of an index-driving flag rod is journalled. The function of these bearing blocks is to rotatably connect the crank portion of the flag rod with the center pan section of the pulsating diaphragm in a manner to cause the eccentric crank portion of the flag rod to swing back and forth in an arcuate path in response to the pulsating movement of the diaphragm. The reciprocating, arcuate swinging movement of the crank portion of the flag rod causes the relatively aligned end portions thereof to oscillate about a common axis of rotation, and the oscillating movement of one end portion of the flag rod serves to drive the usual valving mechanism and the usual indicating and recording mechanisms of the gas meter.

A great many of the difficulties encountered with this type of gas meter stem from the type of bearings utilized to connect the flag rods of the meter with the diaphragm center pans. These prior art bearings usually comprise a socketed base section which is soldered or otherwise rigidly secured to the sheet metal center pan section of the diaphragm, and a bearing block section which is formed with a circular bearing opening to receive the crank portion of the flag rod and which is also provided with a cylindrical stud adapted to be detachably secured to the socketed base section of the bearing. In the assembly of such bearings, the base sections thereof are soldered in relatively exacting linear alignment to the sheet metal center pan of the diaphragm, and the bearing block sections are slipped over one end of the flag rod and then moved into proper position on the crank portion of the flag rod, and finally secured in the sockets of the base sections of the bearings by means of cotter pins or the like. Thus, when it become necessary to replace or repair a worn bearing, the entire flag rod must be disassembled or disconnected from its end journals to permit the worn bearing block to be removed from the flag rod and a new replacement bearing block to be fitted thereon. This disassembly and reassembly of the flag rods of a gas meter represents an arduous and time consuming job, and greatly adds to the maintenance costs of this type of gas meter.

Also, due to the interfitting, telescoping relationship of the base section and bearing block section of these bearings, it is necessary in the manufacture and assembly of the diaphragm assemblies that the base sections of the bearings be accurately located and soldered to the center pan in relatively exacting alignment, otherwise, the crank portion of the flag rod will tend to bind and seize in the bearings, thus causing extreme wear of the bearings, or an intolerable frictional resistance to the normal movement of the diaphragm. A further disadvantage of the prior art bearing is that they cause the diaphragm center pan to follow the arcuate path of movement of the eccentric crank portion of the associated flag rod, rather than move in a truly straight line passing through the axis or center of the diaphragm assembly. This arcuate movement or lateral displacement of the movable portion of the diaphragm assemblies of the meter results in an inherent inaccuracy in the volumetric reading of the meter.

Accordingly, it is the primary object of this invention to provide an improved bearing bracket for connecting the diaphragm center pans to their associated flag rods, and one which may be operatively assembled or disassembled without requiring the disassembly of the associated flag rod from its bearing supports, and one which provides a materially greater tolerance in the location and alignment of the bearing brackets on the center pan of the diaphragm assembly.

Another object is to provide a bearing bracket of the quick disconnect type which may be easily and cheaply assembled or disassembled, and which includes a replaceable wear strap for journalling the crank portion of the flag rod to the diaphragm center pan of a gas meter.

A further object of the invention is to provide a quick disconnect bearing bracket which permits the movable portions of an associated diaphragm assembly to move in truly straight line travel, while permitting the crank portion of the flag rod to move in its usual arcuate path in response to the linear reciprocating movement of the diaphragm assembly, thus greatly increasing the accuracy of the associated meter.

These and other objects and advantages of the present invention will become more readily apparent by reference to the following detailed description and the accompanying drawings, wherein:

FIG. 1 is a side elevational view, partially in vertical section, of a four-chamber, twin-diaphragm, positive displacement-type gas meter incorporating the quick disconnect bearing brackets of the present invention;

FIG. 2 is a fragmentary elevational view looking toward the movable center pan portion of one of the diaphragm assemblies of the gas meter, and showing the present quick disconnect bearing brackets operatively connecting the crank portion of a flag rod to the movable center pan portion of the diaphragm assembly;

FIG. 3 is an enlarged, detailed horizontal sectional view taken along the line 3—3 of FIG. 1, and illustrating, by broken lines, the path of movement of the diaphragm assembly and of the associated flag rod;

FIG. 4 is a detailed horizontal sectional view taken through one of the quick disconnect bearing brackets of the present invention and along line 4—4 of FIG. 2.

FIG. 5 is a detailed, vertical sectional view taken along the line 5—5 of FIG. 2;

FIG. 6 is an exploded perspective view of one of the quick disconnect bearing brackets showing the strap portion disconnected from the base block portion thereof.

Referring now to the drawing, FIG. 1 illustrates a typical four-chamber, twin-diaphragm, positive displacement-type gas meter which utilizes the quick disconnect bearing brackets of the present invention. This meter comprises a generally hollow main casing section 10 which is appropriately divided internally into a plurality of separated compartments or chambers. The main casing section 10 is closed at either side thereof by flanged end covers 11 and 12 which are detachably bolted to the main casing section by means of cap screws or bolts 13. Mounted in two of the chambers of the main casing section of the meter is a pair of bellows-type diaphragm assemblies indicated generally by reference numerals 14 and 15. The diaphragm assemblies 14 and 15 are identical in construction and each comprises a rigid back plate 16 stationarily secured to a centrally disposed distributor conduit 17, a flexible bellows section 18 and a movable center pan section 19 composed of sheet metal. In the usual manner, the respective diaphragm assemblies 14 and 15 are arranged for alternate expansion and contraction, and it will be noted that FIG. 1 depicts the left diaphragm assembly 14 in an expanded position and the right diaphragm assembly 15 in a retracted position.

The center pan section 19 of each diaphragm assembly is connected by a pair of the present quick disconnect bearing brackets 20 with the eccentric, axially offset, intermediate crank portion 21 of an index-driving flag rod or shaft 22. Each of the flag rods 22 is formed with axially aligned opposite end portions which are journalled, respectively, for rotation in bearings 23 provided on the lower wall of the main casing section 10 and on the intermediate divider wall 24 which separates the diaphragm chambers from the upper valve and index drive housing 25 of the gas meter. In the usual manner, the alternate expansion and contraction of the diaphragms in response to the introduction and exhaustion of gas therefrom causes the intermediate crank portions 21 of the flag rods 22 to swing back and forth in an arcuate path of movement, as illustrated in FIG. 3 of the drawing. This arcuate swinging movement of the crank portion 21 causes the axially aligned opposite end portions of the flag rods 22 to oscillate or rotate back and forth within their bearings 23. As will be understood by those familiar with the art, the extreme upper end portions of the flag rods 22 are drivingly connected with a tangent crank and link arm assembly, not shown, which functions to translate the oscillatory motion of the flag rods into appropriate rotational movement of the indicator gauges and valving mechanism of the meter, also not shown.

Referring now more particularly to the improved quick disconnect bearing brackets 20 of the present invention, each bracket comprises a generally rectangular base block 26 which is preferably formed from a copper or bronze alloy, of which is preferably soldered or otherwise rigidly fixed to the sheet metal center pan 19 of the diaphragm assembly. Each bearing bracket 20 further comprises a generally U-shaped or stirrup-type wear strap 27 which is molded or otherwise formed from a substantially rigid, wear-resistant, self-lubricating-type plastic or synthetic resin, such as one of the acetal polymers or copolymers, polyamides, or the like. As shown particularly in FIGS. 4, 5 and 6, the wear strap component 27 of the bearing bracket is detachably connectable with the base block 26 by means of a pair of headed pins or studs 28 whose shanks are press-fittted or otherwise rigidly secured in corresponding openings formed in the base block 26, and whose relatively enlarged heads are spaced slightly outwardly from the base block 26. The wear strap 27 is formed to provide a central or intermediate bight portion 29 which is spaced outwardly from the outer face of the base block 26 a distance approximately equal to the diameter of the crank portion 21 of the flag rod 22, and which terminates in relatively flat, opposite end portions 30 and 31 arranged to flatly engage the outer face of the base block 26. The end portion 30 of the strap section 27 is formed with a longitudinally disposed slot 32 which extends through the outer edge of the portion 30, and which is arranged to receive the exposed shank portion of the left hand stud 28, as viewed from FIG. 6. The opposite end portion 31 is formed with a transversely disposed slot 33 which opens at the lower edge of the end portion 31 and is adapted to fit around the exposed shank portion of the right hand stud 28 of the base block 26, and beneath the enlarged head portion of the stud. The lower, outer corner portion 34 of the end rest portion 31 is preferably beveled to facilitate the insertion and passage of the lower edge of the end rest portion 31 beneath the head of the right hand stud 28. FIGURE 6 shows the bearing bracket 20 which is positioned on the lower portion of the flag rod 22 (FIGURE 1) and the one positioned on the upper portion thereof is identical except that the entire assembly is reversed in order that the slot 33 is directed upwardly. The reason this slot in the upper bracket is directed upwardly is so that contact with a support collar 21a by the upper bracket will not tend to displace the portion 30 from the stud 28. Supports 21a are usually provided for vertical support of the diaphragm during its stroke.

As seen in FIGS. 1 and 2, each of the diaphragm center pans 19 is provided with a pair of bearing brackets 20, and the brackets of each pair are arranged on the center pan in vertically spaced, horizontally disposed order. The base blocks 26 of each pair of bearing brackets are soldered to the center pan 19 in approximate vertical alignment, slightly to one side of the vertical center line of the pan 19, as shown in FIG. 2. In assembling the bearing brackets, the base blocks 26 are soldered to the center pans 19 with the wear straps 27 disconnected therefrom. The crank portion 21 of the flag rod is then moved into engagement with the outer face of the base block 26, and the longitudinally slotted end rest portion 30 is then inserted beneath the headed outer end of the left hand stud 28 (see broken line position in FIG. 2) with the wear strap disposed at an angle to the base block 26 and the crank portion 21 of the flag rod 22. The transversely slotted end rest portion 31 is then pivoted downwardly from the broken line position shown in FIG. 2, assuming this is the lower bracket 20, and forced beneath the headed outer end of the right hand stud 28. In this latter positon, the bight portion 29 of the wear strap 27 forms an elongated horizontally disposed slot 39 with the outer face of the base block 26 and movably confines the crank portion 21 of the flag rod 22 therein. As shown in FIGS. 5 and 6, the end rest portion 31 of the wear strap 27 is preferably formed with a snap-locking detent 36 which is arranged to frictionally engage in a shallow recess 37 formed in the outer face of the base block 26, so as to frictionally hold the wear strap 27 in its closed or locked position on the base block 26.

However, due to the limited resiliency of the plastic material from which the wear strap 27 is formed, the detent 36 may be relatively easily disengaged from the recess by forcibly pushing or lifting upwardly upon the end portion 31 of the strap.

As seen in FIG. 6, the inner bearing surface 38 of the bight portion 29 of the wear strap is substantially flat, whereas the outer surface thereof is formed with a relatively thickened, longitudinally extending reinforcing rib 39 which substantially prevents flexure of the intermediate bight portion 29 of the wear strap during operation of the bearing bracket.

The operational characteristics of the present bearing bracket are best illustrated in FIG. 3 from which it will be noted that as the diaphragm assembly moves linearly from its extended (full lines) position to its retracted (broken lines) position, the crank portion 21 of the flag rod 22 swings in an arc and slides substantially from one end of the slot 35 to the other. In time, the inner bearing surface 38 of the wear strap 27 will become worn, and when wear is sufficient to cause material lost motion between the flag rod and the diaphragm assembly, the wear strap must be replaced with a new one. This is easily accomplished simply by swinging the end portion 31 of the wear strap upwardly to disengage the detent 36 from the recess 37 and the vertical slot 33 from the right hand stud 28. The longitudinal slot 32 may then be disengaged from the left hand stud 28 of the bearing block, and the worn out wear strap discarded and replaced by a new one. As will be apparent, this replacement of a worn wear strap does not require disassembly or demounting of the associated flag rod 22, and this greatly reduces the time and cost of overhauling the meter, as contrasted with the procedures heretofore employed in replacing worn bearing brackets.

In view of the foregoing, it will be seen that the present invention provides an improved, quick-disconnect-type bearing bracket for gas meter diaphragms, and one which functions to permit movement of the associated diaphagm assembly in a truly linear path of movement while at the same time permitting the associated flag rod to oscillate in its required arcuate path of movement. Additionally, bearing brackets made in accordance with this invention are comparatively more economical to manufacture, install and replace than prior art bearing brackets.

While a single preferred embodiment of the invention has been illustrated and described in detail, it will be understood that various modifications as to details of construction and design may be resorted to without departing from the spirit of the invention or the scope of the following claims.

What is claimed is:
1. A bearing bracket for detachably connecting an arcuately movable shaft to a linearly movable reciprocal diaphragm assembly comprising a metallic base block for substantially permanent securement to a diaphragm assemby, said block being formed with an elongated, planar bearing surface and having a pair of relatively spaced apart, headed studs projecting outwardly from the bearing surface of said block; and a wear strap having opposite, slotted end portions detachably engaged with the studs of said base block, and an intermediate bight portion spaced outwardly from the bearing surface of said block and defining therewith an elongated bearing opening, said strap being normally arranged to slidably embrace a shaft positioned against the bearing surface of said block, but being readily disengageable from the studs of said block to permit free disengagement of such a shaft from both said block and said strap.

2. A bearing bracket as defined in claim 1, wherein said block and strap are provided with relatively engageable detent and recess means operable to prevent accidental disengagement of said strap from the studs of said block.

3. A bearing bracket as defined in claim 1, wherein said strap is composed of a self-lubricating synthetic resin.

References Cited
UNITED STATES PATENTS 2,923,322  2/1960  Gilmore _____ 73—278

FOREIGN PATENTS 793,072  4/1958  Great Britain.

JAMES J. GILL, *Primary Examiner.*

R. SALZMAN, *Assistant Examiner.*